May 6, 1969     JEAN-CLAUDE NUDELMONT     3,443,162
CURRENT DISTRIBUTOR
Filed March 30, 1967     Sheet 1 of 2
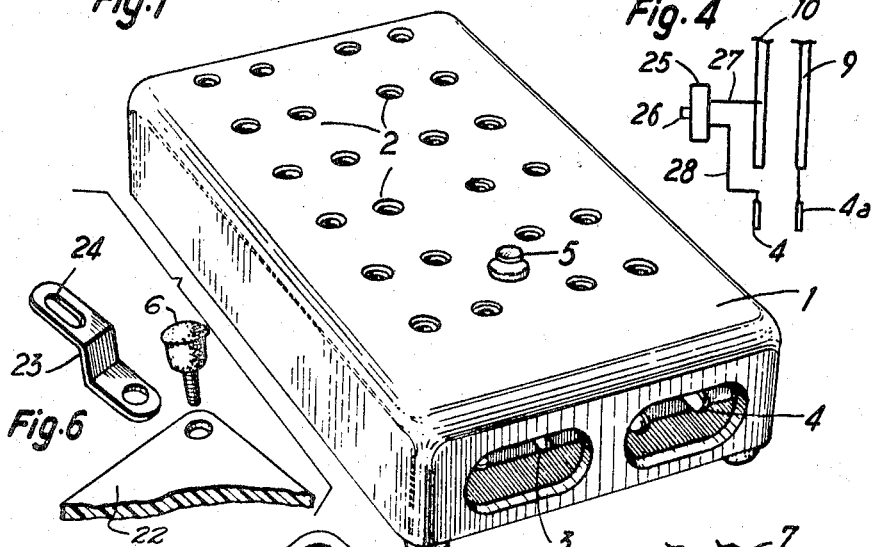
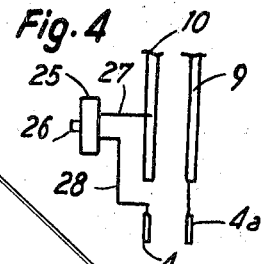
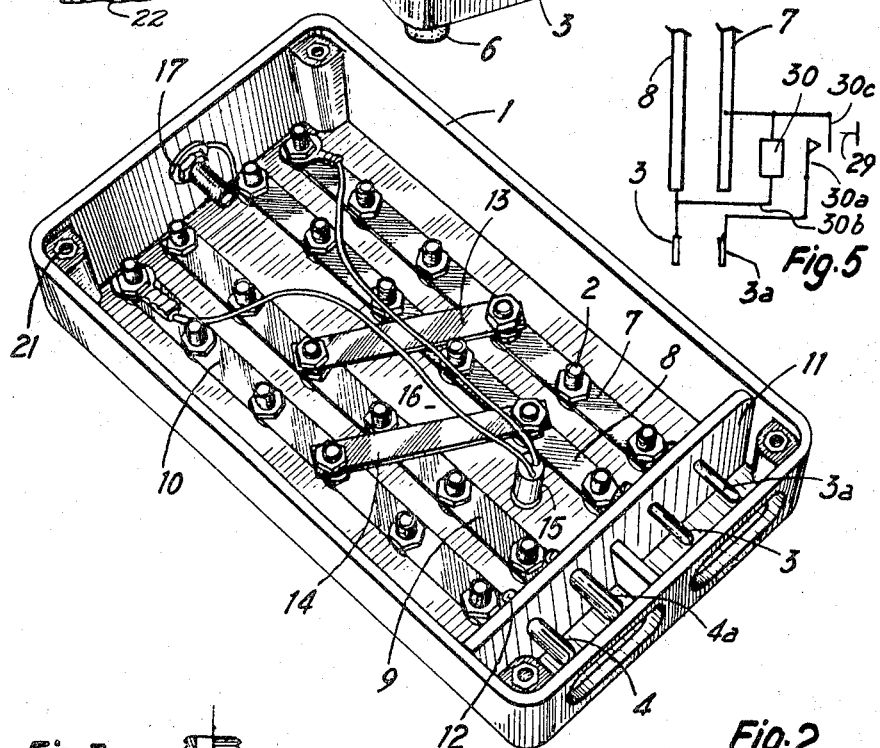
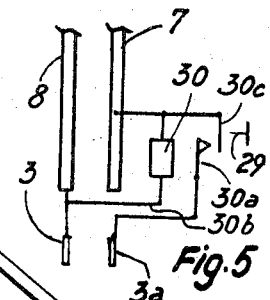
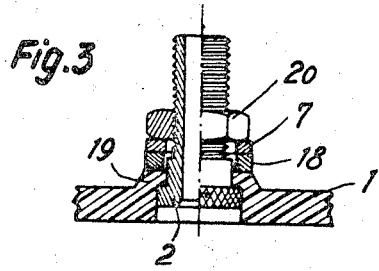

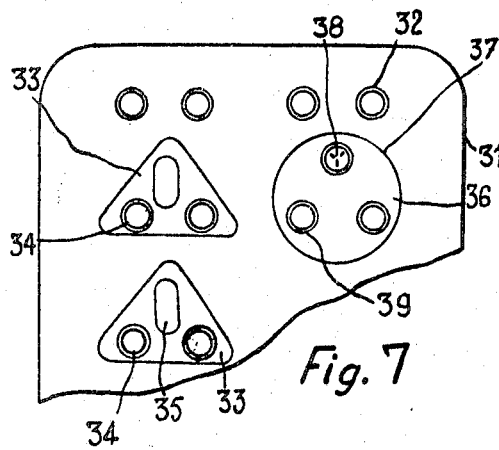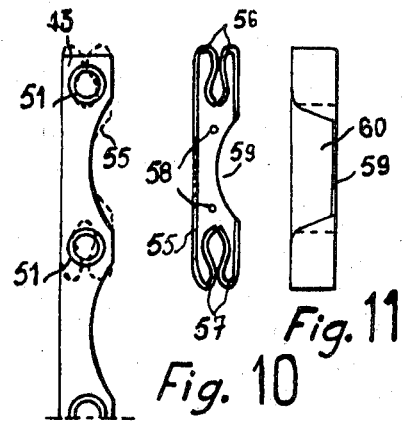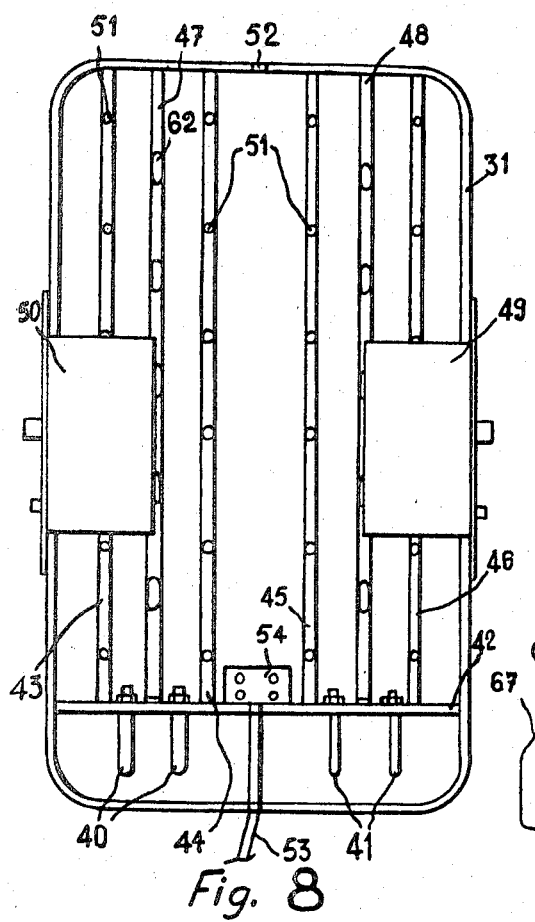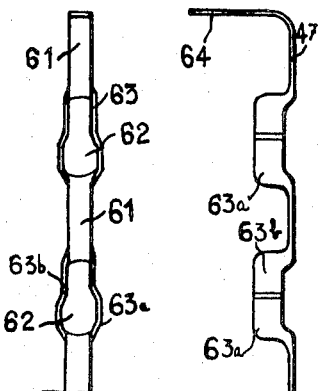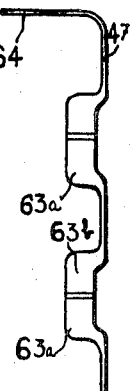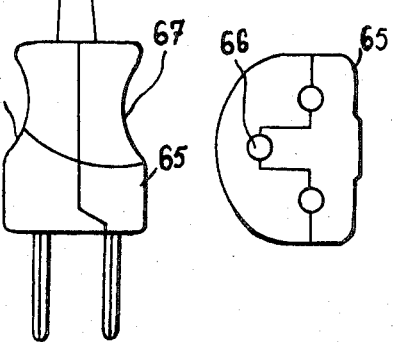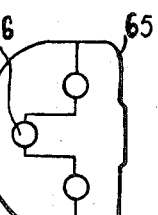

United States Patent Office 3,443,162
Patented May 6, 1969

3,443,162
CURRENT DISTRIBUTOR
Jean-Claude Nudelmont, Courbevoie, France, assignor to Professional General Electronic Products, Courbevoie, France
Filed Mar. 30, 1967, Ser. No. 627,021
Claims priority, application France, Apr. 19, 1966, 58,070
Int. Cl. H02b 1/06; H01r 13/46
U.S. Cl. 317—118                    10 Claims

ABSTRACT OF THE DISCLOSURE

A current distributor allowing simultaneous coupling of several load devices to either high or low load current supply, said distributor including sockets for receiving male plugs associated with the load devices which have connecting pins of varying spacing and configuration, and dimensions.

---

The majority of industrial users of electrical apparatus, make use of multiple sockets when they wish to connect several devices to the same wall socket.

In general, these connections do not have any serious disadvantages when domestic apparatus is concerned, but it is quite different on industrial premises, especially in a laboratory. It is not unusual, in fact, to see numerous measuring devices connected by hazardous connections including bare wires connected to the terminals of another device in service.

Experience shows, in fact, that the number of wall plugs normally provided proves to be clearly insufficient.

Apart from the disadvantage of being inconvenient, these connections which frequently require several multiple removable sockets, located in series, involve faulty current feeding which in certain cases may be particularly troublesome.

This is the case when defective feeding occurs in the course of an experiment requiring perfect regulation of the current.

However, independently of the poor quality of the connections used for supplying current to laboratory equipment, it is not unusual for current break-down. Even very short ones cause serious disadvantages. The moment the supply of current is resumed, falsifying of the results of an experiment occurs. It is obvious that any excess strength must be carefully avoided, a feature which is not always the case when only a central circuit breaker is available for all the electrical installations.

Furthermore, the important development of techniques and world-wide commercialization of numerous new products induces the users of electrical apparatus and, particularly, of laboratory apparatus, such as measuring devices, to use wiring which is frequently precarious and defective in order to use electrical plugs, standardized abroad, but which are not adapted to the sockets used in countries employing the imported apparatus.

This applies to all countries; for example, American plugs have lateral blades for feeding current and a center pin for the ground connection, while in the so-called "Schuko" German connector, the ground connector is formed by two lateral blades, etc.

The inter-axial space between the pins corresponding to the different device load currents and the spacing of the ground pin from the current pin also varies from one type of socket to the other.

The result is that users are obliged to change their connectors or to make use of adaptors which may cause, in the case of very precise laboratory experiments, defective feeding. It may happen that the replacement of certain plugs leads to the omission of the earth connection, which may involve serious disadvantages.

The frequent change of apparatus implies the necessity of having a distributor capable of functioning perfectly despite the frequent insertion and withdrawal of the plugs.

Similarly, since apparatus may be used under increasingly difficult conditions of employment, the current distributor should be able to resist very frequent handling without shocks.

Finally, in view of the simultaneous use of numerous devices, the number and size of connector accessories should be reduced to the minimum.

The present invention consists of a new type of current distributor characterized by the combination of one or more sockets of different dimensions carrying the electrical current of a predetermined value. Bars are connected to each of the pins of the said socket. Components are mounted on each of the bars for receiving plugs of identical or different dimensions and constructions. The bars are capable of being connected to any kind of ground connection and may receive pins of similar or different diameter and position, according to the type of plugs employed. The casing comprises several series of openings permitting the introduction of plugs of different dimensions and constructions which cooperate with the bars. Apertures and openings suitable for receiving circuit breakers or other control means are incorporated in the distributor.

The invention further consists of a new type of connecting component fixed to the bars of the current distributor which is characterized by the presence of two leaf springs, each bent at their ends and having two perpendicular axes of symmetry. One of the leaf springs is capable of being severed, if desired, at its center, in order to ensure a maximum current carrying capacity connection.

The invention also includes a new type of bars fixed to the current distributor. The bars comprise several perforated elements having two edges or flanges forming a spring, these edges being separated by a certain length on an initial portion and separated by another length on a second portion, the distance between the said perforated elements being such as to permit the use of a maximum number of plugs.

The invention includes a new type of three-pin plug, characterized by a double opening permitting the withdrawal and insertion of such plugs in the current distributor, despite the proximity of the location of the adjacent plugs, this proximity being made possible by the openings and by a half-flat portion of the lower portion of the said plugs supporting the pins.

In this manner a strong compact device is produced, having a great capacity for connections and reliable operation, despite frequent insertion and withdrawal of the plugs connected to the diverse apparatus. The diverse apparatus is automatically protected by the circuit breaker or breakers provided in this new type of distributor.

Other advantages and features of the invention, will be apparent, however, from the following description with reference to the attached drawings which represents, by way of example, two principal embodiments of the distributor.

In the drawings:

FIGURE 1 is a perspective view of a first embodiment of the distributor.

FIGURE 2 is an interior perspective view of the device, after removing the lower protecting plate.

FIGURE 3 is a detail elevation, partially in section, of one of the sockets for the multiple voltage supplies to the apparatus, while aiding in the assembly of a connecting bar.

FIGURE 4 is a schematic view of an electric circuit of the distributor containing the circuit breaker disengaged by excess current.

FIGURE 5 is a schematic view of an electric circuit relating to the cut-out circuit breaker in the case of voltage failure.

FIGURE 6 is an exploded view of the fixing clip assembly to the protecting plate of the casing.

FIGURE 7 is a schematic view of a portion of the upper parts of the distributor forming a second embodiment of the present invention.

FIGURE 8 shows a schematic view of the interior of the distributor casing of FIGURE 7.

FIGURE 9 is a plan view of a portion of a connecting bar.

FIGURE 10 is a plan view of a double connecting clip.

FIGURE 11 is a profile view of the double connecting clip of FIGURE 9.

FIGURE 12 is a plan view of a bar for the connection of the ground pins.

FIGURE 13 is a profile view of the ground bar of FIGURE 12.

FIGURE 14 is an elevational view of a socket specially designed for the distributor, and FIGURE 15 is a view, in plan, of such a socket.

Referring to the drawings, the casing 1, FIGURE 1, is preferably of bakelite or any other suitable material having excellent di-electric characteristics.

The sockets 2 incorporated in the apparatus at the moment of moulding, are disposed in pairs, in this embodiment along two parallel rows. They may, according to interior wiring or according to external connections, making available to the load devices, distribute either the same current or different currents. The voltages reach the inner connections by means of male plugs 3, 3a, 4 and 4a. The male plugs 3 are used to provide load currents reaching five amperes, for example, the male plugs 4 providing load currents reaching fifteen amperes.

However, the apparatus is designed both for domestic and for laboratory use in which the frequency of the currents employed may be very high.

According to one embodiment of the invention, a luminous viewing aperture 5 is lighted by a neon tube 15 as soon as the current is available at the various top points of the apparatus.

It will be observed that neither the male plugs nor the sockets are level with the outer surface of the apparatus, a feature which ensures safety in use.

Rubber feet 6 ensure the adhesion of the casing with the surface on which they rest.

In the embodiment selected by way of example and shown in FIGURE 2, the sockets 2 are connected together by connecting bars 7, 8, 9, 10, the angle-bent ends of which rest on the insulation plate 11.

The male plugs are mounted on this plate and their threaded portions such as 12, receive a nut which makes it possible to keep each of the bars 7–10 locked in contact with the plugs 3, 3a, 4 and 4a.

The ends of these bars may be remote, if desired, from the plate 11 in case a contact or another circuit is inserted between the terminal of a male plug and its bars. Similarly, the bar may be mounted so that the angled part (not shown) does not rest on the plate 11 but on the part opposed to the casing or, if desired, the bent portion may be omitted.

A bar 13, insulated from the bar 8, connects the bars 7 and 9 in the present case. Similarly, the bar 14, connects the bars 8 and 10.

The advantage of this connection is being able to have a large number of output sockets available from only one source of current which may come either from the male plugs 3 or the male plugs 4.

In this embodiment the terminals of the neon tube 15 functioning below 110 and 220 volts, are connected by the wires 16 to the bars 7 and 10.

It is obvious that in a case where the bars 13 and 14 would be omitted, neon tubes could be provided, one of which would be connected to the bars 7 and 8 and the other to the bars 9 and 10.

Similarly, it is obvious that the ground connection constituted by the socket 17 may be connected to any bar, in the case of continuous current or connected only externally.

As to the bars 13 and 14, they may be insulated by means of a sheath, for example, of stirrup shape, thus avoiding the use of thick washers at their points of attachment.

FIGURE 3 shows the assembly of a socket 2 and a bar. The bar 7 is kept locked in place by the nut 20 against the washer 18 and a reinforcement 19 of the casing 1. Thus, bars may be disposed at difference levels, if necessary.

The method of manufacture employs moulding the casing with incorporation of sockets. This greatly facilitates the assembly of the connecting members while leaving a large volume reserved for laboratory apparatus.

The apparatus incorporates in the above described circuits, a micro-circuit breaker for protecting the apparatus itself, or if necessary, the apparatus or load devices used with this distributor from excess voltages.

For this purpose, a circuit breaker is preferably mounted on the side of the casing, parallel to the connecting bars. The above mentioned distribution circuit is modified according to the diagram shown in FIGURE 4 in which the circuit breaker is shown at 25. Since the circuit breaker may be of any desired type, only its control switch 26 is shown, fixed to the casing and its terminals 27 and 28. In the selected example, the bar 10 is disconnected from the male plug 4 and is connected by means of nuts 20 to establish contact of the bar to an output socket including terminal 27 of the circuit breaker. In turn, the terminal 28 is connected to the plug 4.

In this case, bar 9 is connected to the bar 8. The bar 7 is disconnected from the plug 3a, whilst the bars 7 and 10 are electrically cross connected and the terminals of the plug 4 is connected to that of the plug 3a. The result is, that if the circuit breaker 25 opens its contact owing to an excess voltage, the bars 10 and 7 no longer receive current so that there is no current available at the output sockets. The neon tube 15, which is connected this time between the bars 8 and 10, for example, is extinguished. Current is re-established by closing the contact of the circuit breaker again by means of the switch knob 26.

While the apparatus which has just been described surmounts various disadvantages as explained above, and while it is not only perfectly safe but also very convenient, other modifications are still required for certain applications.

A breakdown of current is not generally of primary importance in the use of domestic equipment. This is not so in cases where the apparatus used are employed in industry and, particularly, when they are employed in a laboratory. The stoppage of current, even followed by an immediate resumption, may cause a final breakdown of certain apparatus, especially upon the sudden re-engagement of other apparatus, thus involving unpleasant consequences such as incorrect results, or an experiment which has to be completely performed again, etc.

According to the present invention, these disadvantages may be surmounted or mitigated by combining the above described distributor and another micro-circuit breaker, the control switch of which is mounted on the casing of the apparatus and the object of which is to cut out the current in the event of a deficiency of voltage.

The result is that, when the current is re-established, the sockets 2 can no longer supply current without the operator re-establishing the internal connections by operating the switch for engaging the micro-circuit breaker.

In order not to overload the drawings the micro-circuit breaker is not shown in FIGURE 2, but the manner in which the circuits of the circuit breaker are combined with the above mentioned connections is described hereinafter and illustrated in FIGURE 5.

The push button 29 permits the engagement of the micro-circuit breaker or disjunctor 30 and is located near terminals 3 or 4 and on one of the sides of the apparatus, for example.

According to one embodiment, a micro-circuit breaker having only one contact 30a may be used.

The terminal of the connecting bar 7 is disconnected from the terminal 3a. From this terminal an initial circuit begins comprising in series: the contact 30a (normally open in the absence of voltage on the terminals of the coil of circuit breaker 30 and the circuit breaker itself), the terminal 30b (of which is connected to the junction of the bar 8), and the terminal of the male plug 3. However, the bar 7 is connected to the blade 30c of the contact 30a.

It is apparent, under these conditions, that even after the plugs 3 and 3a have been connected to a current source, the output sockets connected to the bars 7 and 8 do not receive any voltage, since the contact 30a, inserted between the terminal 3a and the bar 7, is open. The operator must therefore depress the button of the circuit breaker so that the control lamp 5, shown in FIGURE 2, lights up, that is to say, so that voltage appears on the terminals of the sockets served by these bars. In fact, when the voltage is re-established on the male plugs 3 and 3a, the user depresses the push button 29, the latter displaces the blade 30c which closes the contact 30a. A circuit is then established between the input terminus 3 and 3a by the contact 30a and the coil of circuit breaker 30 which, being energized, keeps the contact 30a closed when the user releases the button 29.

If it is assumed that the bars are connected in accordance with the drawing shown in FIGURE 2, it is clear that voltage also appears on the output sockets connected to the bars 9 and 10. If, instead of connecting the plugs 3 and 3a to a current source, the plugs 4 and 4a are connected, all the distributor sockets may be used independently of the circuit breaker.

According to another variation, the assembly which has just been described may be retained but the bars 13 and 14 omitted. In this manner, the distributor has two entirely separate circuits.

In order to be able to use the circuit breaker either in the event of the connection of the plugs 3 or in the case of the plugs 4 it is then only necessary to disconnect the bar 9 from the terminal of the plug 4a, to connect the terminals of the male plugs 3a and 4a and to maintain the connection 13 and 14. Thus, whatever the plugs employed may be, the depression of the button 29 closes the control and retaining contacts 30a so that the coil of the circuit breaker, being energized, keeps its contact 30a closed, thus ensuring the energization of the various bars.

In order to warn the operator of the re-establishment if voltage on the input terminals, the terminals 4 and 4a are connected directly to a second control tube (not shown). It is only by depressing the button of the circuit breaker that the first tube 15 lights up, indicating that the apparatus is in service.

It is clear that the assemblies which have just been described may be obtained by interchanging the part of the terminals of the plugs 3 and 3a or those of the terminals 4 and 4a.

It is also apparent, with reference to FIGURE 2, that the positioning of the bars 13 and 14 may be modified in order to bring the first control lamp 15 to the center and leave more room for the circuit breaker 30 which could then be mounted on the upper portion of the casing.

Two circuit breakers could also be mounted, one on the terminals of the plugs 3 and 3a, the other on the terminals 4 and 4a. The circuit breakers may then be of any desired type.

The incorporated sockets 21 embedded in the bakelite, are used for the attachment of the protecting plate 22 shown in FIGURE 4. In order to be able to attach the distributor to a wall, the clips 23 have a recess corresponding to the thickness of the rubber feet 6, shown in FIGURE 6. They are kept locked between the plate 22 and the fixing screw cooperating with the threaded bushes 21. When the distributor is simply placed on a table, the member 23 is disposed below the casing; when it is desired to secure the distributor to the wall, it is only necessary to pivot the clip 23 about its fixing screw. The openings 24 then make it possible to couple the apparatus close to the wall. Due to the recess provided on the clip 23, the apparatus rests on the rubber feet 6.

It is clear that numerous changes could be made to the casing and to the circuits which are incorporated therein without departing from the scope of the present invention. By way of example, the ground socket could be set in a bar secured by means of two rivets, whilst the neon tube could be selected for voltages other than 110–220 volts. For particular applications, the casing itself could be sheet metal and the male plugs adapted to receive other currents by means of three terminals instead of two, for example. The distributor could obviously again comprise one or more cords serving for connections.

According to a second embodiment of the invention, described hereinafter, the current distributor is arranged in order to receive connecting plugs of all designs whether foreign or American plugs with or without grounds.

FIGURE 7 shows only a portion of the upper part of the current distributor casing. This purely schematic view shows that the casing 31 comprises a series of apertures such as 32 and a series of triangular blocks such as 33 also provided with circuit apertures 34 and elongated apertures 35. The casing may also comprise blocks such as 36, the skirt 37 of which makes it possible to guide and protect current plugs, the pins of which are inserted in the openings 39. The member 36 also comprises a ground pin 38.

The members 36 and the members 33 are attached to the casing 31 during the moulding.

According to the invention, the casing 31 is formed of a material of great strength, for example, bakelite reinforced by incorporation of textile or the like fibers. In this manner, the casing 31 efficiently protects the components such as 36 and 33 against any shocks or very heavy stresses.

The casing comprises a covering of a certain thicknes (not shown), preferably of rubber, closing the side portion of the casing 31 and thus enabling the buttons for the control and cut out of circuit breakers or disjunctors to be protected. The circuit breakers or disjunctors control the operation of the current distributor which may however be handled due to the provision of suitable lighting.

Pins are shown at 40 and 41 for coupling to the supply of current. By way of example, the pins 40 are used to feed a load current of 15 amperes below 220 volts, the pins 41 serving to feed a load current of 5 amperes below 110 volts. These plugs are secured to the partition 42 and may be connected by any suitable means to the connecting bars 43, 44, 45, 46 and even possibly to the bars 47 and 48.

The drawing does not show the connections which may exist between these various bars or between these bars and the disjunctors or circuit breakers shown schematically at 49 and 50, these may be of any desired type, due to the arrangements used.

In the drawings, the bars 43, 44, 45 and 46 are shown such as they appear before the positioning of the connecting clips shown in FIGURES 9 to 11.

The bars are preferably set in the elements such as 33, the setting preferably causing the openings 34 to correspond to the holes 51 formed in the bars 43 to 46. The ground bars 47 and 48 are mounted on the casing either by setting or by means of screws and bolts. The casing 31 may also comprise a passage 52 for the insertion of a ground wire. This passage 52 could naturally be located at any point of the casing 31, for example, between the pins 40 and 41. The small plate 42 may comprise connecting devices such as stirrups or dominoes for example, receiving the current distribution wires 53. It is then possible, as desired, to supply current through the pins 40 (or 41) or by means of the cable 53 attached to connecting elements such as 54.

FIGURE 9 shows part of a connecting bar such as 43, for example, on which a double connecting clip 55 is shown in dotted lines. This member is mounted so that the ends 56 and 57, forming the springs, are located opposite holes 51. The clip is shown in dotted lines and it is possible to make its shape match that of the bar 43 which is recessed in its center portion. This recess facilitates any connections which may have to be made to a ground pin such as 38 which may be fixed to the casing by a threaded end and a nut.

It is clear that this recess plays no part when the holes 51 are not opposite the holes 39 corresponding to an element 36. In cases in which only elements such as those appearing at 33 in FIGURE 7 would be used, this recess could be omitted.

The shape of the double clip is shown better in FIGURE 10. The parts 56 and 57 are curved so that the pins introduced into the openings 34 or 39 are kept locked, whatever the shape and thickness of the pin introduced. Each of the parts 56 or 57 are formed by two separate curved plates. They may also receive pins of a comparatively large diameter without being damaged. The quality of the material is, however, selected to maintain a constant elasticity. As desired, these clips may be set directly on the connecting bars or even in certain cases secured by means of screws inserted in the holes 58.

FIGURE 11 is a profile view of the clip. The recessed part 59 permits easy insertion of adjacent elements. According to the invention, the double structure of the clip permits numerous manipulations without risk of deterioration. The part 60 of the clip permits not only constant spacing between the members 56 and 57 to be maintained, but also ensures a rigidity avoiding any premature movement of the ends of the clip when the connecting plugs are withdrawn.

A ground bar is shown in part in FIGURES 12 and 13, comprising half-flats such as 61 and also elongated openings 62 bounded by parts 63. Parts 63b are closer together than the parts 63a, which is shown more clearly in FIGURE 13.

The end 64 of the bar 47 is curved with an angle bend so that it can be fixed to the partition 42, for example. These fixing operations may be effected by setting or any other suitable means, screws and nuts for example.

Referring to FIGURE 7, it may be seen that any type of plug whatever may be used. In fact, the ground pin is inserted in the slot 35 and penetrates between the two edges 63 of the bar 47, FIGURES 8, 12 and 13. Thus, axial distance between the ground pin and connecting pins may vary within considerable limits without necessitating any change or adaptations whatever. Likewise, the connecting pins required for the current may be of any kind since, once they are inserted in the holes 34, they cooperate with the bent ends 56 and 57 of the connecting clips 55. By way of example, let us assume that we have to deal with a French plug or a German plug, the ground of which is not used. Each of the pins feeding current practically penetrates in the part located in the plane of symmetry of the end 56—or 57 in FIGURE 10—of the corresponding connecting clip. If, on the contrary, an American connection is used in which the cylindrical pins are replaced by blades of a certain thickness, each of the blades penetrates into the bent portion of the edge of the connecting clip nearest to the bar 47, while the ground pin, penetrates into the opening 35. comes into contact with the corresponding part 63b of the member 47. Likewise, a French plug with ground clip may have the pins feeding current cooperating with the center parts of the ends 56 and either the part 63b, or the part 63a of the member 47 coupling the ground pin. The distance of the interaxial line of the ground pin to the current feeding pins, may vary according to the plug employed.

Thus, the new structure of the current distributor provides a universal device capable of receiving plugs, the dimensions of whose pins and interaxes thereof may comply with the various standards adopted in various countries.

However, in order to be able to utilize the maximum of plugs with such an apparatus, special connections are provided such as that shown in FIGURE 14. These connections have the advantage of greater compactness due to the provision of a half flatened portion 65 shown more clearly in FIGURE 15. The pins 66 are split so as to give greater flexibility to the unit and to ensure excellent contact with the connecting bars or ground bars.

Furthermore, the plugs have concave portions 67, on the four faces shown in FIGURE 14, permitting a simple, manual coupling.

Although the drawings show preferred embodiments of the present invention, it is clear that the numerous omissions, additions or substitutions could be made to the various components forming this new type of current distributor without departing from the general scope of the invention. The casing could comprise, instead of a rubber sheath making it possible to prevent premature operation of the on and off switches of the circuit breakers or disjunctors, suitable bosses or simple sliding or turning discs blocking the openings in the casing in which the control switches of the disjunctors are disposed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An improved current distributor for selectively coupling electrical current to a plurality of male plugs including pins of varying dimensions, configuration and spacing, said distributor comprising: a casing of insulated material, a plurality of spaced, insulated current carrying bars, means for selectively supplying current of at least one load level to at least one of said bars, means for grounding at least one of said bars, a plurality of pin connecting components mounted on each of said bars for receiving the depending pins of said male plugs, and a plurality of apertures carried by said casing and aligned with said components so as to permit insertion of said plug pins within said casing and into engagement with said components to effect current distribution.

2. The current distributor as claimed in claim 1 wherein said casing includes a viewing aperture, a neon lamp positioned within said aperture, and means for electrically coupling said lamp across said ground and said current carrying bar for indicating the application of supply current to said distributor.

3. The current distributor as claimed in claim 1 further including circuit breaker means carried by said distributor and operatively associated therewith, for interrupting the current supply to said inserted plug in response to improper applied voltage.

4. The current distributor as claimed in claim 1 wherein said component for receiving said male plug pins comprise sockets, said sockets including heads embedded in said casing, apertures formed in said bars, and portions passing through said aperture, and nuts threaded to said socket portions for locking said socket to said bar.

5. The current distributor as claimed in claim 1 in which the components coupled to said bar each comprise two leaf springs bent at each of their ends and having two perpendicular axes of symmetry, and means carried by one of said leaf springs, at the center thereof to limit the maximum current capacity of the electrical connection.

6. The current distributor as claimed in claim 1 wherein said bar forming a ground connection include perforated elements having two edges forming a spring, the edges being separated by a certain length on initial portion and by another length on a second portion whereby the distance between the perforated elements are such as to permit the use of a maximum number of male plugs.

7. The current distributor as claimed in claim 1 wheresaid means for selectively supplying current to said bar includes a current conducting pin and means for supporting said pin on said casing, and said distributor further includes circuit breaker means electrically coupled between said pin and said bar.

8. The current distributor as claimed in claim 1 further including; pins coupled to said source of supply current, a low voltage circuit breaker formed by two circuits, the first circuit having two terminals, one being connected to one of said bars, the other terminal being connected to a non-connected bar, said second circuit comprising at least one normally open contact, said contact connected between the connected bar and a non-connected pin, said first circuit ensuring the energization of said non-connected bar as soon as the normally open contact is closed.

9. The current distributor as claimed in claim 1 for permitting the withdrawal and insertion of current carrying male plugs having three pins, said distributor including connecting elements secured to the current receiving and ground bar including lateral and depending recesses formed therein and a half-flat portion of the lower part of said plug supporting the pin allowing close proximity to adjacent plugs when coupled to said current distributor.

10. The current distributor as claimed in claim 1 wherein said series of apertures carried by said case include aligned elongated apertures and circular aperatures, the series of elongated apertures being staggered relative to the series of circular apertures and disposed on the median line between the two rows of circular apertures, whereby said apertures serve for the passage of pins of any desired shape and diameter.

References Cited
UNITED STATES PATENTS

| | | | |
|---|---|---|---|
| 3,076,167 | 1/1963 | Spencer et al. | 339—19 |
| 3,218,601 | 11/1965 | Feeser | 339—14 X |

LEWIS H. MYERS, *Primary Examiner.*

J. R. SCOTT, *Assistant Examiner.*

U.S. Cl. X.R.

174—59